United States Patent

[11] 3,633,268

[72] Inventor Reiner Engbert
Talheim, Germany

[21] Appl. No. 829,233
[22] Filed June 2, 1969
[45] Patented Jan. 11, 1972
[73] Assignee Telefunken Patentverwertungsgesellschaft m.b.H.
Ulm am Danube, Germany
[32] Priority June 4, 1968
[33] Germany
[31] P 17 64 426.7

[54] METHOD OF PRODUCING ONE OR MORE LARGE INTEGRATED SEMICONDUCTOR CIRCUITS

10 Claims, 12 Drawing Figs.

[52] U.S. Cl. .......... 29/574, 29/577
[51] Int. Cl. .......... B01j 17/00, H01l 7/00
[50] Field of Search .......... 29/577, 574, 577 IC

[56] References Cited

UNITED STATES PATENTS

| | | | |
|---|---|---|---|
| 3,312,871 | 4/1967 | Seki et al. .......... | 29/577 (IC) |
| 3,377,513 | 4/1968 | Ashby et al. .......... | 29/577 (IC) |
| 3,423,822 | 1/1969 | Davidson et al. .......... | 29/577 (IC) |

*Primary Examiner*—John F. Campbell
*Assistant Examiner*—W. Tupman
*Attorney*—Spencer & Kaye

ABSTRACT: The disclosure relates to a method of producing one or more integrated semiconductor circuits in which the usable basic circuits on a semiconductor wafer are connected together and the useless basic circuits bypassed. For this, a conductive path mask is produced photographically from at least two individual masks one of which represents the conductive paths to a usable basic circuit and another of which represents the paths necessary to bypass a useless basic circuit.

Inventor:
Reiner Engbert
By: Spencer & Kaye
Attorneys

Inventor :
Reiner Engbert

By: Spencer & Kaye
Attorneys

Inventor:
Reiner Engbert
By: Spencer & Kaye
Attorneys

METHOD OF PRODUCING ONE OR MORE LARGE INTEGRATED SEMICONDUCTOR CIRCUITS

BACKGROUND of the INVENTION

In the integration of entire circuits in the semiconductor art, there has been a changeover to producing large complex circuits on a single semiconductor wafer. There are two main ways of producing them, the applicability of which will depend largely on the magnitude of the reject quotas. On the one hand, a plurality of like basic circuits can be produced on one semiconductor wafer, the useful ones being interconnected subsequently to form a large circuit. A prerequisite for this is that there should be as many useful basic circuits present on the semiconductor wafer as are needed for the construction of the large circuit. The basic circuits are generally logical configurations, trigger stages and the like which are interconnected to form shift registers, stores or parts of an arithmetic unit. This method has the advantage that the production of the simple basic circuits has already been and the reject quota can be kept so low that manufacture of large circuits is possible. The disadvantage of the method consists in that a separate mask is necessary for each semiconductor wafer in order to establish the connections between the useful basic circuits, because the position and number of useful basic circuits is always different from one semiconductor wafer to another. The conductor mask, which is separately drawn and manufactured for each semiconductor wafer, is useless after it has been used once, for example as an etching mask for etching the conducting-path structures out of a continuous metal layer provided on the surface of the semiconductor. It is therefore obvious that the above-mentioned method, hitherto used, is extravagant, irrational and expensive and necessitates the employment of a large staff of highly qualified skilled workers.

A further possibility for producing large circuits consists, not in composing the large circuits from individual, simple basic circuits, but in producing them as individual elements by means of the known diffusion, masking and vapor deposition technique. These individual elements then represent a complicated circuit often with several thousand circuit elements. The advantage of this method consists in that a plurality of such large circuits can be accommodated on one semiconductor wafer and contact be made to them. A disadvantage is the high quota of rejects in these circuits because this rises rapidly with the number of circuit elements in a single circuit so that it is very questionable whether, from the large number of circuits on the semiconductor wafer, at least one can be used. To this must be added high costs for the complicated operational aids with this method because the manufacture of masks for circuits with several thousand individual elements for example is not simple, taking into consideration the structural width which can still be realized.

Because of the still serious disadvantages which the last-mentioned method involves, large circuits are today frequently composed of simple basic circuits. The starting point may be numerous similar basic circuits which are then appropriately wired together in order to obtain desired combinations. Thus it is possible, for example, by interconnecting a plurality of NOR gates, to produce also AND gates, OR gates or even parts of arithmetic units.

SUMMARY OF THE INVENTION

It is a object of the invention to rationalize considerably the mode of operation hitherto used.

According to the invention there is provided a method of producing one or more integrated semiconductor circuits which consist of a plurality of basic circuits accommodated in a common semiconductor wafer, which method includes the steps of producing a plurality of like or different basic circuits in or on one semiconductor wafer with repeated use of the mask technique, measuring the characteristics of said basic circuits present on said semiconductor wafer, preserving the result of said measurements in a test record, composing a conductor mask necessary for producing conducting paths between said basic circuits from different individual masks by analyzing the test report, and finally producing the conducting paths extending over the surface of the semiconductor wafer and connecting the usable basic circuits electrically to one another by means of said composite conducting path mask.

BRIEF DESCRIPTION of the DRAWINGS

Two embodiments of the invention will be described by way of example with reference to the accompanying drawings in which.

DESCRIPTION of the PREFERRED EMBODIMENTS

Figure 1:
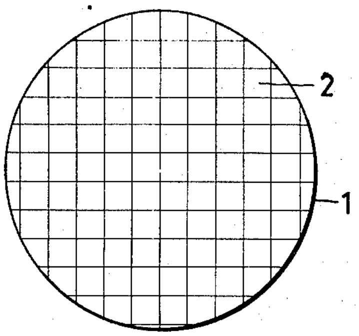
FIG. 1 shows, in plan view, a semiconductor wafer having a plurality of like basic circuits.

In order to simplify and rationalize considerably the mode of operation hitherto used in this method, a method of producing one or more large circuits from a plurality of basic circuits is therefore proposed according to the invention, which provides for a plurality of like or different basic circuits to be produced on or in one semiconductor wafer with the repeated use of the mask technique, that following on this, the basic circuits present on the semiconductor wafer are measured and the result of the measurement is preserved in a test record, that by analyzing the test record, a conductor mask necessary for establishing conducting paths between the basic circuits is composed from various individual masks, and that finally conducting paths extending over the surface of the semiconductor wafer and connecting the useful basic circuits electrically to one another are produced by means of this mask.

As an aid to understanding the present invention, the sequence of operations in the production of the integrated basic circuits will first be discussed. Numerous masking, etching and diffusion processes are necessary for the production of integrated circuits. Thus a semiconductor wafer is first provided with an oxide layer for example, in which windows for the indiffusion of the collector regions are formed by means of the photomasking and etching technique. A plurality of diffusion windows are necessary for each integrated circuit because integrated circuits often contain a large number of transistors and diodes. After the indiffusion of the collector regions, the semiconductor wafer is again provided with an oxide layer in which diffusion windows again have to be provided for the indiffusion of the base regions. In order to introduce the emitter regions into the base region, the procedure described is repeated once again. Simultaneously with the transistors, any diodes, semiconductor resistors or capacitors which may be necessary are diffused into the semiconductor wafer. Further masking processes are necessary for the vapor deposition of the conducting paths by means of which the circuit elements are connected with one another, and for the connection and contact points.

From this it is clear that in order to manufacture a plurality of integrated circuits on one semiconductor wafer, a whole set of masks is necessary, the individual masks being used in succession in order to open the various diffusion windows in an oxide layer. In the manufacture of the masks, the procedure is generally that the master mask for only a single circuit is first drawn on a large scale. The whole mask for the semiconductor wafer is then produced from this large-scale individual drawing by greatly reducing this drawing and repeatedly reproducing it photographically by the so-called "step-and-repeat process." On every displacement of the necessary camera by the size of one circuit element, the mask image is again reproduced. If this method is repeated step-by-step and row-by-row, then, at the end, a coherent picture is obtained of the mask provided for the whole semiconductor.

The method according to the invention provides that, in the manufacture of large circuits from like or different basic circuits, an assortment of individual masks is prepared, each individual mask containing possible configurations of conducting paths in the region of the semiconductor surface which includes a basic circuit. In the simplest case, in which a large circuit can be formed by connecting the electrodes of usable basic circuits situated in a row, two individual masks are needed. In this case, the one individual mask then contains the configurations of the conducting paths which lead from the edge of the semiconductor region which includes one basic circuit to the electrodes of the usable basic circuit, while the other individual mask contains configurations of conducting paths which again start from the edge of the semiconductor region of a basic circuit but bypass the electrodes of the basic circuit recognized as unusable. The starting points of the configurations of conducting paths at the edge of the masks must be exactly alike in both individual masks in order that the patterns or configurations of the conducting paths may coincide at the edges of the individual masks described when these are strung together.

In the "step-and-repeat process" already mentioned, the two individual masks are interchanged in a sequence resulting from the test report. In this manner, the complete or total composite mask for the large circuit to be produced from the useful basic circuits is composed in the manner of a mosaic, so that the pattern or configurations of the conducting paths in the mask bypass all unusable circuits and interconnect the electrodes of all usable basic circuits. Once they have been produced, the two individual masks can be used for any semiconductor wafer because in order to produce any whole conductor mask, only the interchange sequence of the two individual masks has to be altered during the "step-and-repeat process." Since the measurement of the basic circuits is effected automatically, the results of the measurement are preserved in storage elements, and the guidance of the step-and-repeat device and of the interchange of the individual masks necessary in the course of this is controlled electronically through the electronic analysis of the test record, using computers, the drawing and reduction of new sets of masks every time is eliminated in the method according to the invention.

Shift registers, for example, can be produced from bistable trigger stages lying in a row, by means of only two individual masks in the manner indicated.

According to an alternate method of composing the final or complete conductor mask, by means of the "step-and-repeat process" described, an intermediate conductor mask can first be produced which contains only the structures of an individual mask at the points provided therefor, while the regions which are adapted for the reproduction of another individual mask remain unexposed. A second conductor mask is then prepared which contains the structures of the second individual mask at the points at which the first conductor mask remained unexposed and itself remains unexposed at all other points. Then the two intermediate masks are superimposed in register and photographed, so that a photographically produced complete or final composite mask is obtained which comprises the structures of both individual masks at the points provided therefor and resulting from the test record. This method can also be used for a plurality of individual masks to be assembled together, by producing intermediate masks which contain only the structures of one individual mask at appropriate points in each case. All of these intermediate masks are superimposed and the stack of masks is photographed in order to obtain the etching mask for the semiconductor wafer. This method has the advantage that during the manufacture of the intermediate masks, the individual masks do not have to be interchanged constantly in a time-wasting process.

The basic circuits in different rows on the semiconductor wafer can naturally also be interconnected to form a large circuit by the method according to the invention. For this purpose, however, further individual masks are necessary which contain the configurations of conducting paths for the connections between the individual rows. If basic circuits are to be combined in different manners, for example if some of the basic circuits are to be connected in parallel and other in series, then additional individual masks are necessary which contain the parallel connections for usable basic circuits and the bypass connections for unusable basic circuits respectively, as conducting-path patterns. In order to prepare the complete conductor mask, these individual masks are again combined like a mosaic so that the usable basic circuits on the semiconductor wafer can be interconnected to form a required large circuit by means of this mask.

Different basic circuits may also be prepared on a semiconductor wafer if the etching, diffusion and vapor deposition masks necessary for the production of this basic circuit are likewise composed of different individual masks. Thus different types of circuits may be accommodated simultaneously on a common semiconductor wafer, the usable ones being combined to form a complex large circuit. In the case, too, the test report for all basic circuits on the semiconductor wafer is used to compose a complete mask for the semiconductor wafer in a mosaiclike manner, by photographic means, from an assortment of available individual masks.

Logical configurations such as AND gates, NOR gates, inhibit gates, coincidence gates, anticoincidence gates or negation gates are examples of possible different basic circuits on a common semiconductor wafer. Said gate circuits are understood, in the data processing and communications are, the mean logical configurations which comprise a plurality of input electrodes and in which a potential, which is a function of the potential appearing at the input electrodes, appears at the output electrode. Such logical configurations, and the possibility of realizing them is an integrated semiconductor technique is known from the relevant literature so that it is superfluous to go into this further here. Said types of basic circuit may be interconnected, for example, to form known arithmetic units, counting chains or stores.

The more different basic circuits there are on a semiconductor wafer and the more complicated the large circuits are which can be produced from this basic circuit, the more comprehensive the assortment of individual masks must naturally be from which the whole mask is composed in a mosaiclike manner. Depending on the position and number of the usable units from the various types of basic circuit, there will also be a plurality of possibilities for combining the basic circuits with one another to form one or more complicated large circuits. It would therefore be logical to program a computer so that it determines the optimum utilization of the usable basic circuits present on the semiconductor wafer on the basis of the test report fed into it, and controls the photographic production of a complete composite mask for the semiconductor by means of the interchange of the individual masks available from the assortment.

After the production of the photographic conductor mask for the entire semiconductor wafer, the surface of this semiconductor wafer containing the basic circuits is coated, for example, with a single-layer or multilayer metal coating and this is covered with a layer of photolacquer. Then the photomask is placed over the semiconductor wafer thus coated, and is exposed in such a manner that, after the development of the photolacquer layers, lacquer only remains over the regions provided as conducting paths between the basic circuits and as connecting surfaces to the large circuits. Finally, the exposed regions of the metal coating are removed in an etching process.

Referring now to FIG. 1 of the drawings, there is shown, in plan view, a semiconductor wafer 1 which is divided into a graticule. At the end of the manufacturing process, each unit 2 of the graticule forms a complete integrated circuit composed of numerous interconnected components. A detail of such an individual circuit, which comprises a transistor and a resistor, is illustrated in section in FIG. 2.

Figure 2:
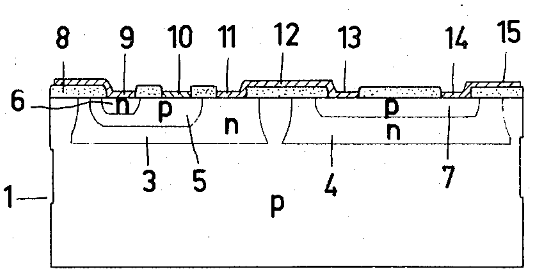
FIG. 2 shows a detail of one of the basic circuits.

According to FIG. 2, the semiconductor wafer 1 consists, for example, of a body of P-type conductivity into which there are diffused two regions 3 and 4 of N-type conductivity which are insulated from one another. Diffused into the region 3, which forms the collector region of a transistor, is a base region 5 of P-type conductivity and diffused into this in turn in an emitter region 6 of N-type conductivity. A resistance layer 7 of P-type conductivity is diffused into the semiconductor region 4 and is provided at both ends, at the semiconductor surface, with electrical terminal contacts 13 and 14. The semiconductor surface is covered with a diffusion-inhibiting insulating layer 8 in which the necessary diffusion windows are introduced during the manufacture of the semiconductor basic circuits. After the termination of all diffusion processes, windows for contact-making are introduced into the insulating layer which was previously completed again, in which windows the terminal contacts 9, 10, 11, 13 and 14 are formed on the components of the semiconductor basic circuit. The components are electrically connected to one another through the metallic conducting paths 12 and 15 extending over the insulating layer.

Figure 3:
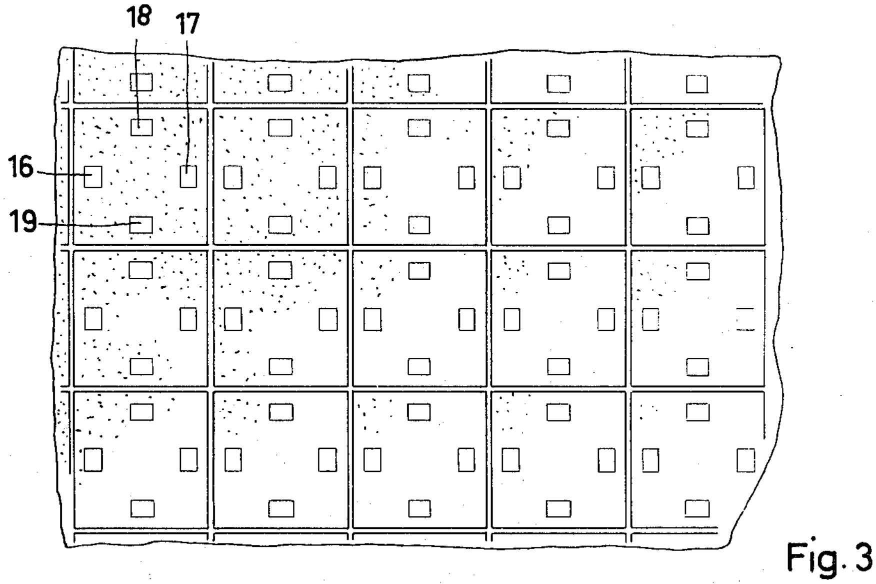
FIG. 3 shows the plan view of a detail of the semiconductor wafer.

FIG. 3 shows in detail, on a larger scale, and in plan view, a plurality of like basic circuits disposed side-by-side on the semiconductor wafer. The basic circuits may be trigger stages, for example, with four connecting contacts 16 to 19. The connecting contact 16 forms the input and the contact 17 the output of the trigger stage, while the contacts 18 and 19 are provided for the connection of the source of supply voltage. The portion of the surface of the wafer which is not covered by the contacts is formed by an insulating layer of silicon dioxide for example.

Figure 4:
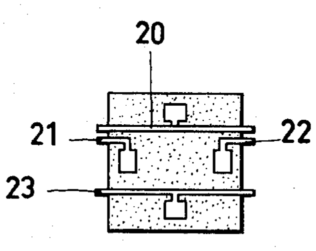
FIGS. 4 and 5 show two different individual masks.
Figure 5:
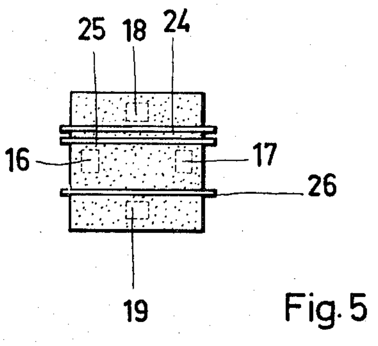
Figure 6:
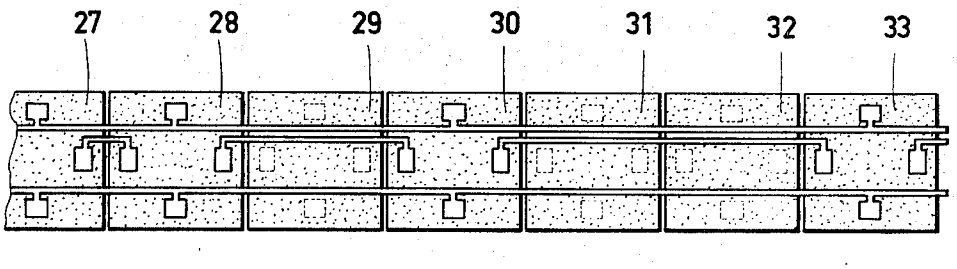
FIG. 6 shows the interconnected usable basic circuits which are disposed in a row on the semiconductor wafer.

In FIG. 4 and in FIG. 5, two individual masks are illustrated by means of which, as shown in FIG. 6, the usable trigger stages disposed in one row are connected in series to form a shift register. The individual mask shown in FIG. 4 contains the conductor patterns 20, 21, 22 and 23 which connect the electrodes of a usable trigger stage to the edge of the semiconductor region which includes that one trigger stage. The individual mask shown in FIG. 5 contains the conductor patterns 24, 25 and 26 which extend exclusively over the insulating layer and bypass the electrodes 16 and 19 of a useless trigger stage. If the individual masks are placed side by side at the same level, then the ends of the conductor patterns coincide at the edges of the individual masks. As a result, if the individual masks are combined in the manner of mosaic, in the sequence determined from the test report, a coherent conductor pattern is obtained for a series of basic circuits.

FIG. 6 shows a selection of seven trigger stages 27 to 33 situated in one row on the semiconductor wafer. When the trigger stages were measured it was found that the stages 27, 28, 30 and 33 were usable whereas the trigger stages 29, 31 and 32 were incapable of functioning. The result of this measurement is stored on magnetic tape for example and utilized for the control of the step-by-repeat device during the manufacture of the conducting-path mask for the whole semiconductor wafer, so that in the region of the seven trigger stages illustrated, the individual mask shown in FIG. 4 is projected for usable basic circuits and the individual mask shown in FIG. 5 for basic circuits which are incapable of functioning. In this manner, the mask pattern illustrated in FIG. 6 is obtained.

Figure 7:
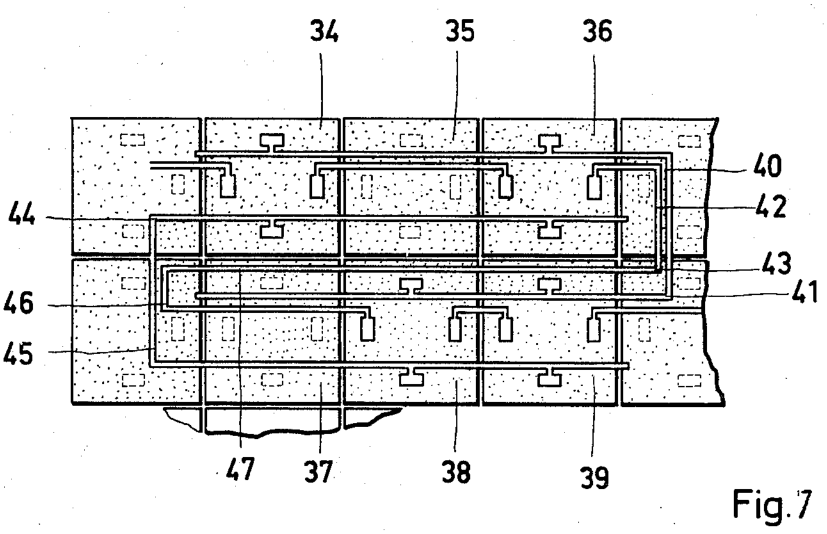
FIG. 7 shows the interconnected usable basic circuits in adjacent rows on the semiconductor wafer.

If, as indicated in FIG. 7, the usable trigger stages in rows of basic circuits situated parallel to one another are to be connected in series, more than two individual masks must be prepared. FIG. 7 illustrates a detail of six trigger stages 34 to 39 in two rows situated parallel to one another. According to the test report prepared and stored, only the trigger stages 34, 36 in the upper row and the trigger stages 38 and 39 in the lower row are serviceable. In order to combine the useful basic circuits in the two rows, the individual masks illustrated in FIGS. 8 to 12 are necessary and are again strung together in a mosaiclike manner in the sequence resulting from the test report, in order to form a complete or composite mask.

Figure 8:
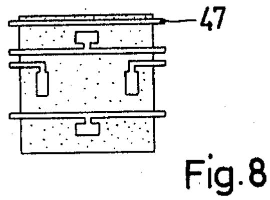
FIGS. 8 to 12 illustrate the individual masks necessary to interconnect usable circuits in adjacent rows on the semiconductor wafer.
Figure 9:
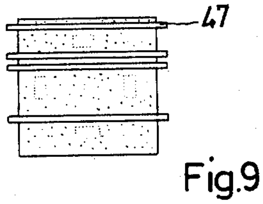
Figure 10:
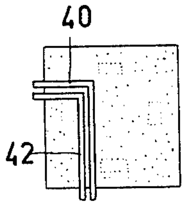
Figure 11:
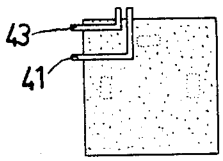
Figure 12:
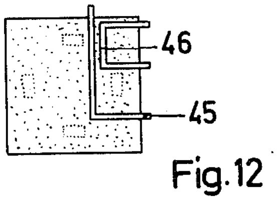

The individual mask shown in FIG. 8 contains the conducting-path patterns for a usable basic circuit which corresponds to the structures in the mask of FIG. 4. To this is added a further conducting-path pattern 47, extending only over the oxide, which serves to connect the last output electrode of a usable basic circuit in the upper row to the first input electrode of a useful basic circuit in the lower row. The individual mask shown in FIG. 9 also corresponds to the mask illustrated in FIG. 5 with the exception of the conducting-path pattern 47. The individual masks shown in FIGS. 10 and 11 contain conducting-path patterns 40, 42 and 41 and 43 respectively whereby the conducting paths at one end of the two rows of basic circuits are interconnected in the manner illustrated in FIG. 7, while the structures 45 and 46 in the mask shown in FIG. 12 comprise the necessary connecting lines for the other end of the two rows of circuits. The conducting path 44 illustrated in FIG. 7 can be realized with a corresponding mask not shown in the FIGURES.

What I claim is new and desire to secure by Letters Patent of the United States is:

1. A method of producing one or more integrated semiconductor circuits which consist of a plurality of basic circuits accommodated in a common semiconductor wafer, which method includes the steps of producing a plurality of like or different basic circuits in or on one semiconductor wafer with repeated use of the mask technique; measuring the characteristics of said basic circuits present on said semiconductor wafer and preserving the result of said measurements in a test record; providing at least two different individual masks, one of which contains the pattern of the conducting paths which lead to the electrodes of a usable basic circuit, and the other of which contains a pattern of conducting paths which bypass the electrodes of a useless basic circuit; analyzing the test report; from the analysis of the test report, composing a conductor mask necessary for producing conducting paths between said basic circuits by selecting and lining up the individual masks, in a sequence resulting from the test report, until a complete conductive path mask for all the basic circuits of the semiconductor wafer is obtained which contains the conducting-path patterns connecting said usable basic circuits to one another; and final using the complete conductive path mask to produce the conducting paths extending over the surface of the semiconductor wafer and connecting the usable basic circuits electrically to one another.

2. A method as defined in claim 1 wherein said a complete conductive path mask for said semiconductor wafer is produced by photographic means by repeated exposure and step-by-step displacement of interchangeable individual masks, said individual mask available being interchanged, in accordance with a schedule determined by said test report, during the photographic production of said conductive path mask.

3. A method as defined in claim 1 wherein a plurality of intermediate conducting path masks for the semiconductor wafer are produced by photographic means, by repeated exposure and step-by-step displacement of an individual mask, each intermediate mask for the semiconductor wafer containing only the configurations of an individual mask at the points arising from said test report, while exposure is prevented at all other points, all the finished intermediate masks, each of which contains only the configurations of one of the necessary individual masks, being superimposed, in register, and the stack of intermediate masks being photographed so that a photographic composite complete conductive path mask is obtained which contains the patterns of all said individual masks combined like a mosaic.

4. A method as defined in claim 1, wherein a plurality of individual masks are produced of such a number as are necessary for the manufacture of a specific large circuit from a plurality of said basic circuits, taking into consideration the occurrence of useless circuits at random points on said semiconductor wafer, and wherein said individual masks, which contain the patterns for the necessary conducting-path structures in the region of a basic circuit in each case, are strung together, in a sequence resulting from said test report, in order to produce a complete mask for the semiconductor wafer by photographic means.

5. A method as defined in claim 1, wherein different basic circuits are produced on the semiconductor wafer.

6. A method as defined in claim 1, wherein using appropriately constructed masks, different logical basic circuits are produced in integrated form on said semiconductor wafer, said logical basic circuits are measured and the result of the measurement is preserved in said test report, and said complete conductive path mask is produced in accordance with this test report by photographic combination of different individual masks, and the usable logical basic circuits present on the semiconductor wafer are connected to one another to form logical configurations by means of said conductive path mask, 7. A method as defined in claim 1, wherein the step of producing said different logical basic circuits comprises producing basic circuits selected from two or more of AND gates, NOR gates, inhibitor gates, coincidence gates, anticoincidence gates or negation gates.

8. A method as defined in claim 1, wherein said complete conductive path mask is produced photographically and therefore the surface of said semiconductor wafer containing said basic circuits is coated with a one or more layer metal coating and this is covered with a layer of photolacquer, then photolacquer is exposed via the complete conductive path mask and developed so as to leave the photolacquer only over the regions provided as conducting paths between said basic circuits and as connecting surfaces to the large circuit, and finally the exposed regions of said metal coating are removed in an etching process.

9. A method as defined in claim 1, wherein the results of said measurements are stored electronically and analyzed in a computer for use in producing the complete conductive path mask for the semiconductor wafer.

10. A method as defined in claim 1, wherein said basic circuits on said semiconductor wafer are selected so that different large circuits can be produced depending on the number of usable individual units of one kind of basic circuit in each case, and a computer is programmed to determine the optimum use of the basic circuits present on the semiconductor wafer on the basis of said test report which is fed into the computer, and controls photographic production of a complete conductive path mask for the semiconductor wafer by the interchange of individual masks available from an assortment, and finally, the usable basic circuits are combined to form one or more like or different large circuits by means of said complete mask.

* * * * *